United States Patent
Jandric et al.

(10) Patent No.: US 9,978,405 B1
(45) Date of Patent: May 22, 2018

(54) HEAT ASSISTED MAGNETIC RECORDING SLIDER HAVING A CONSISTENT CLOSE POINT

(71) Applicant: Seagate Technology LLC, Cupertino, CA (US)

(72) Inventors: Zoran Jandric, St. Louis Park, MN (US); Vasudevan Ramaswamy, Eden Prairie, MN (US); Erik J. Hutchinson, Eden Prairie, MN (US); John Charles Duda, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days. days.

(21) Appl. No.: 15/444,518

(22) Filed: Feb. 28, 2017

Related U.S. Application Data

(60) Provisional application No. 62/302,531, filed on Mar. 2, 2016.

(51) Int. Cl.
| | | |
|---|---|---|
| *G11B 11/00* | (2006.01) | |
| *G11B 5/31* | (2006.01) | |
| *G11B 5/00* | (2006.01) | |
| *G11B 5/60* | (2006.01) | |
| *G11B 7/1267* | (2012.01) | |
| *G11B 7/1263* | (2012.01) | |
| *G11B 7/127* | (2012.01) | |

(52) U.S. Cl.
CPC ............ *G11B 5/314* (2013.01); *G11B 5/6005* (2013.01); *G11B 5/607* (2013.01); *G11B 5/6011* (2013.01); *G11B 5/6076* (2013.01); *G11B 5/6088* (2013.01); *G11B 7/127* (2013.01); *G11B 7/1263* (2013.01); *G11B 7/1267* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,792,311 B2 | 7/2014 | Zheng et al. | |
| 9,202,490 B2 | 12/2015 | Zuckerman et al. | |
| 9,548,072 B2* | 1/2017 | Lou ...................... | G11B 5/6076 |
| 2013/0044575 A1* | 2/2013 | Mori ..................... | G11B 5/3133 |
| | | | 369/13.26 |
| 2013/0170060 A1* | 7/2013 | Johns .................... | G11B 5/1278 |
| | | | 360/31 |
| 2014/0029396 A1* | 1/2014 | Rausch .................. | G11B 13/04 |
| | | | 369/13.23 |
| 2014/0268407 A1* | 9/2014 | Daugela ................ | G11B 5/6029 |
| | | | 360/75 |
| 2015/0162022 A1* | 6/2015 | Peng ..................... | G11B 5/3945 |
| | | | 360/66 |

(Continued)

*Primary Examiner* — Tan X Dinh
(74) *Attorney, Agent, or Firm* — Hollingsworth Davis, LLC

(57) ABSTRACT

A slider configured for heat-assisted magnetic recording comprises an air bearing surface (ABS), a writer, and a close point of the writer. A plurality of heat producing or dissipating components are situated a predetermined distance from a vertical plane that is normal to the ABS and aligned with the close point. A location of the writer close point remains substantially consistent irrespective of which of the plurality of heat producing or dissipating components are energized.

20 Claims, 7 Drawing Sheets

(56) References Cited

U.S. PATENT DOCUMENTS

| | | |
|---|---|---|
| 2015/0199987 A1* | 7/2015 | Canchi .................. G11B 5/607 369/13.11 |
| 2015/0262596 A1 | 9/2015 | Zuckerman et al. |
| 2016/0232930 A1* | 8/2016 | Lou ........................ G11B 5/607 |
| 2016/0275978 A1* | 9/2016 | Zang .................... G11B 5/6011 |

* cited by examiner

WRITE HEAT

CLOSE POINT A AT RP1

WH + COIL

CLOSE POINT B BETWEEN RP1 & WP

WH + COIL + LASER

CLOSE POINT C NEAR WP

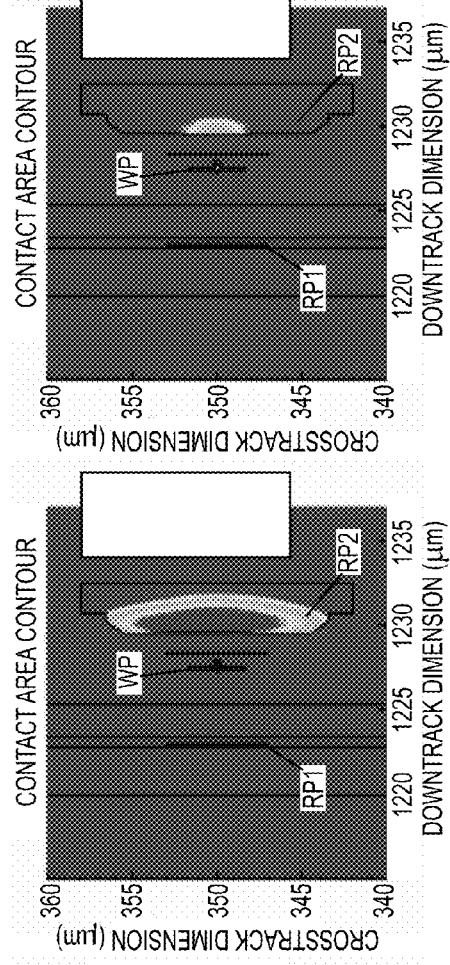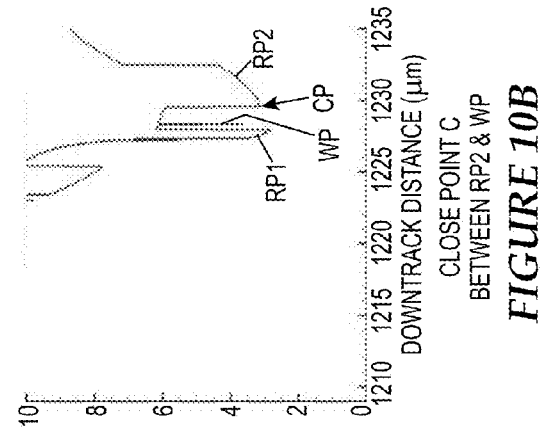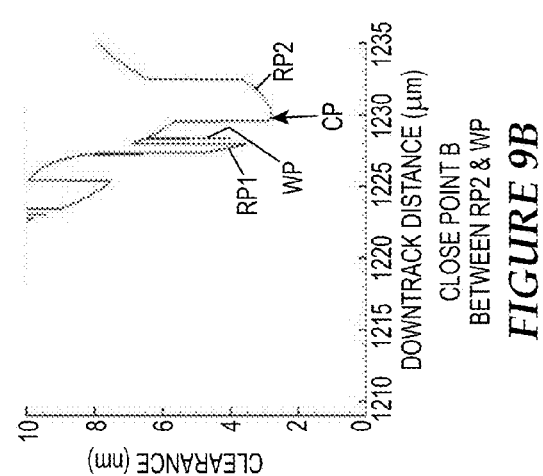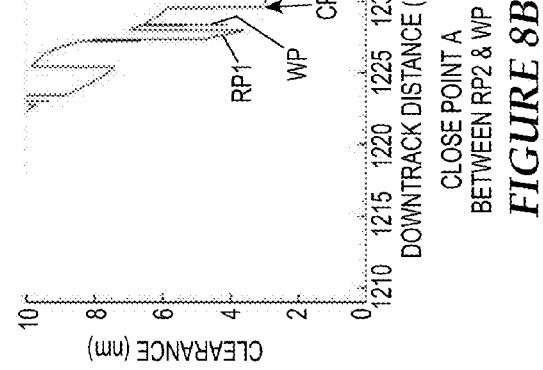

HEAT ASSISTED MAGNETIC RECORDING SLIDER HAVING A CONSISTENT CLOSE POINT

RELATED PATENT DOCUMENTS

This application claims the benefit of Provisional Patent Application Ser. No. 62/302,531 filed on Mar. 2, 2016, to which priority is claimed pursuant to 35 U.S.C. § 119(e), and which is incorporated herein by reference in its entirety.

SUMMARY

Various embodiments are directed to an apparatus comprising a slider configured for heat-assisted magnetic recording. The slider comprises an air bearing surface (ABS), a writer, and a close point of the writer. A plurality of heat producing or dissipating components are situated within a predetermined distance from a vertical plane that is normal to the ABS and aligned with the close point. A location of the writer close point remains substantially consistent irrespective of which of the plurality of heat producing or dissipating components are energized.

Some embodiments are directed to an apparatus comprising a slider configured for heat-assisted magnetic recording. The slider comprises an ABS, a writer, and a close point of the writer. A plurality of heat producing or dissipating components are situated within a region of the slider that includes a vertical plane which is normal to the ABS and aligned with the close point. The region has a total distance, d, along the ABS of about 6 µm or less. A location of the writer close point remains substantially consistent irrespective of which of the plurality of heat producing or dissipating components are energized.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein:

FIGS. 8A, 9A, and 10A are contact area contour profiles for a writer of a HAMR slider implemented in accordance with various embodiments; and FIGS. 8B, 9B, and 10B are illustrations showing clearance of writer structures for the HAMR slider characterized in FIGS. 8A, 9A, and 10A.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure is generally directed to read-write heads used in magnetic recording devices such as hard drives. In particular, this disclosure relates to heat-assisted magnetic recording (HAMR), which can be used to increase areal data density of magnetic media. HAMR may also be referred to as energy-assisted magnetic recording (EAMR), thermally-assisted magnetic recording (TAMR), and thermally-assisted recording (TAR). In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider will also generally include a source of energy, such as a laser diode, to heat the media while it is being written to by the write pole. An optical delivery path is integrated into the HAMR slider to deliver the energy to the surface of the recording media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region exceeding the Curie temperature having dimensions less than 100 nm (e.g., ~50 nm).

Figure 1:
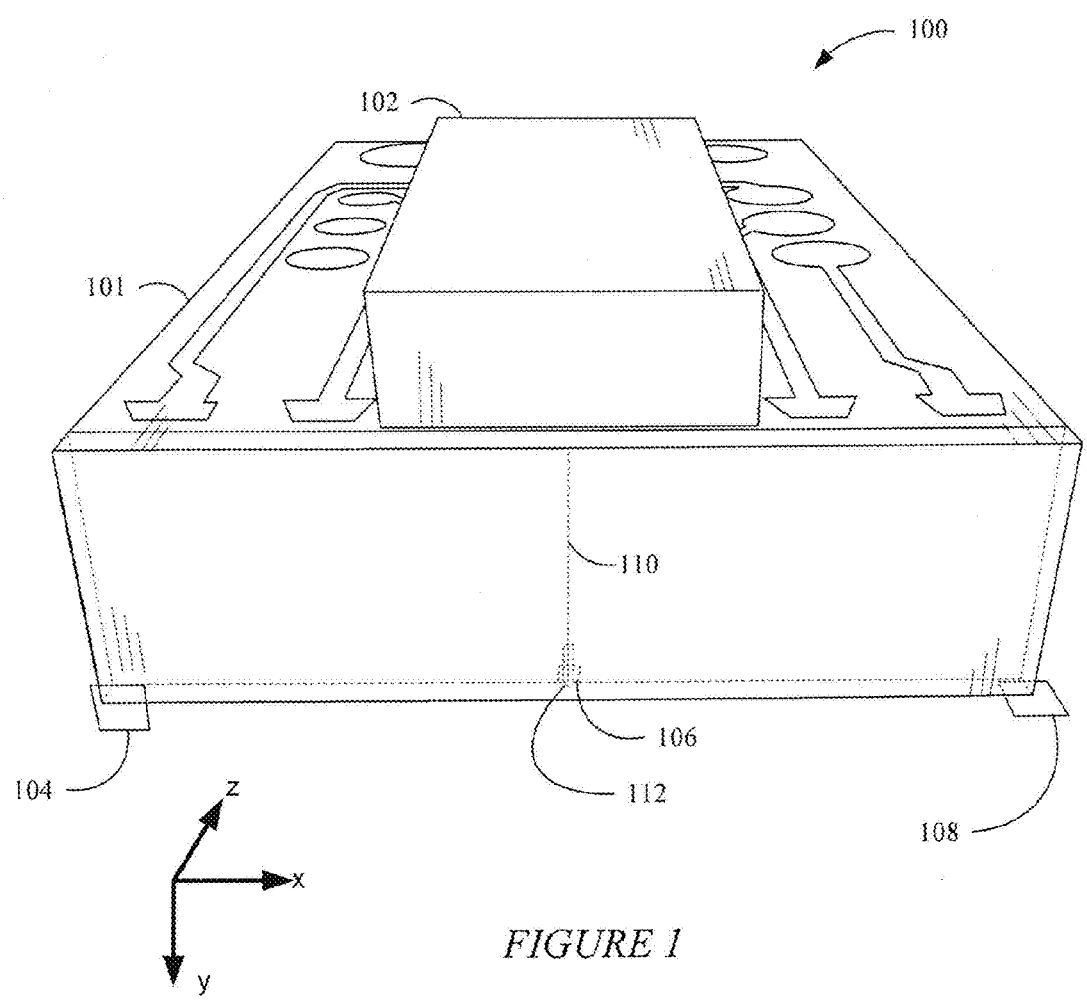
FIG. 1 shows a recording head arrangement in accordance with various embodiments.

With reference to FIG. 1, a perspective view shows a HAMR slider assembly 100 according to a representative embodiment. The slider assembly 100 includes a laser diode 102 located on input surface of a slider body 101. In this example, the input surface is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components are formed integrally within the slider body 101 (near a trailing edge surface 104 in this example) and function as an optical path that delivers energy from the laser diode 102 to the recording media via a near-field transducer (NFT) 112. The NFT 112 is near the writer of the read/write head 106 and causes heating of the recording media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the representative embodiment in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
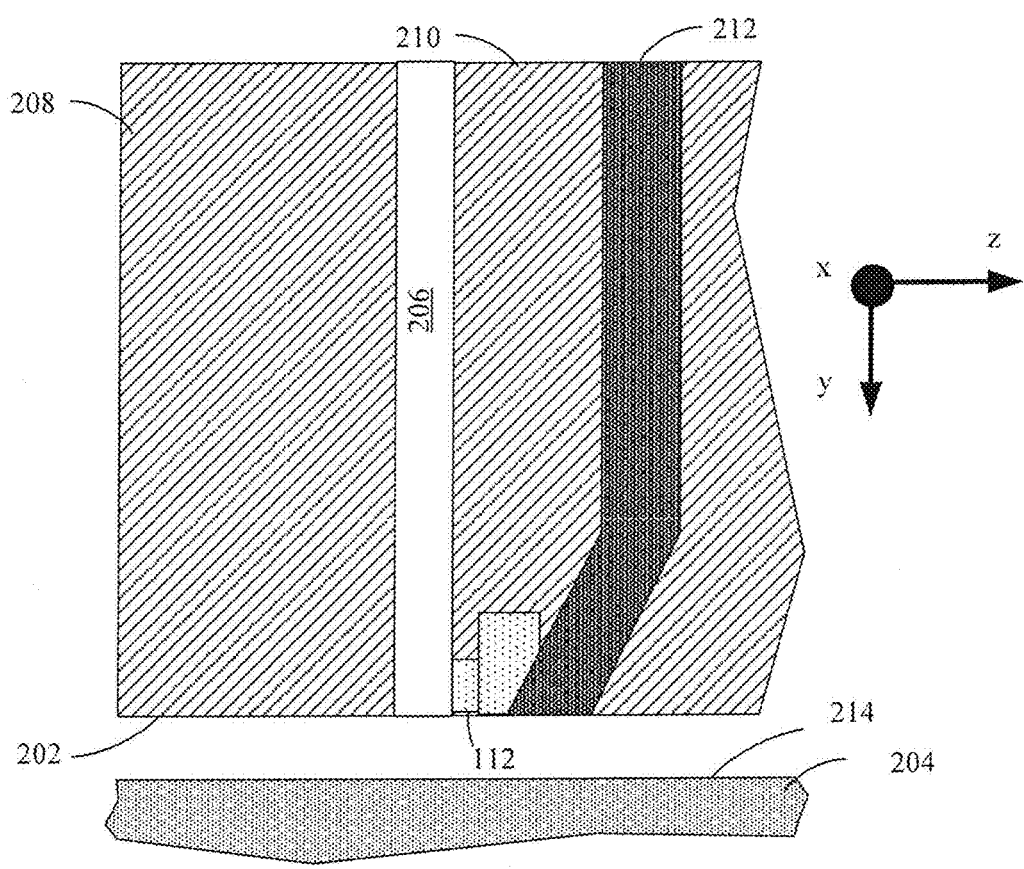
FIG. 2 illustrates a perspective view of a HAMR slider that may be implemented in accordance with various embodiments of the disclosure.

With reference now to FIG. 2, a cross-sectional view shows details of a HAMR slider according to a representative embodiment. Near-field transducer 112 is located proximate a media-facing surface 202 (e.g., ABS), which is held near a magnetic recording media 204 during device operation. In the orientation of FIG. 2, the media-facing surface 202 is arranged parallel to the x-z plane. A waveguide core 206 may be disposed proximate the NFT 112, which is located at or near the media writing surface 214.

The waveguide core is 206 surrounded by cladding layers 208 and 210. The waveguide core 206 and cladding layers 208, 210 may be made from dielectric materials such as $Al_2O_3$, $SiO_xN_y$, $SiO_2$, $Ta_2O_5$, $TiO_2$, ZnS, $SiN_x$, $Nb_2O_5$, AlN, $Hf_2O_3$, $Y_2O_3$, AlO, etc. Generally, the dielectric materials are selected so that the refractive index of the waveguide core layer 206 is higher than refractive indices of the cladding layers 208, 210. This arrangement of materials facilitates efficient propagation of light through the waveguide. Light is delivered from the waveguide core 206 along the negative y-direction where it is coupled to the NFT 112. The NFT 112 delivers surface plasmon enhanced, near-field electromagnetic energy along the y-axis where it exits at the media writing surface 214. This results in a highly localized hot spot (not shown) on the media surface 214 when the magnetic recording medium 204 is placed in close proximity to surface 202 of the apparatus. Further illustrated in FIG. 2 is a recording pole 212 of the read/write head that is located alongside the NFT 112. The recording pole 212 generates a magnetic field (e.g., perpendicular field) used in changing the magnetic orientation of the hotspot during writing.

The slider also includes a reader and a writer proximate the media-facing surface 202 for respectively reading and writing data from/to the magnetic recording medium 204. The writer and reader may include corresponding heaters. Each of the heaters is thermally coupled to the slider body and may be a resistive heater that generates heat as electrical current is passed therethrough. The writer heater can be powered to cause protrusion of the ABS predominately in the ABS region at or proximate the writer, and the reader heater can be powered to cause protrusion of the ABS predominately in the ABS region at or proximate the reader. Activation of both the writer and reader heaters causes protrusion of the pole tip region of the slider body which includes both the writer and the reader. Power can be controllably delivered independently to the heaters to adjust the fly height (e.g., clearance) of the slider relative to the surface of the magnetic recording medium 204.

As can be appreciated from the discussion above, the writer of a HAMR slider includes a number of heat sources, including the write pole, the writer heater, the writer coil(s), the optical waveguide, and the near-field transducer (NFT). These components of a conventional HAMR slider are spaced apart from one another in different vertical planes oriented normal to the air bearing surface (ABS) of the head/slider. For example, these heat producing components of a conventional HAMR slider are typically spaced apart from each other by up to about 10 μm or more.

Selective activation of the heat producing or heat dissipating components of a conventional HAMR slider causes the location of the slider's close point to shift significantly. The close point of a slider refers to the location of the slider that is closest to the magnetic recording medium when the slider is flying above the medium. The slider can have one or more close points, such as a writer close point and/or a reader close point. The writer close point is generally understood to constitute a close point of a slider during write operations. The writer close point of a conventional HAMR slider can shift by as much as 8 μm due to selective energization of the spaced-apart heat producing components of the head. Shifting of the writer close point that occurs in a conventional HAMR slider complicates various slider operations that rely on precise control of the writer close point, such as setting slider clearance, dynamic fly height adjustment, and head-medium contact detection, for example.

Embodiments of the disclosure are directed to a HAMR slider that provides for a consistent writer close point regardless of which heat producing/dissipating component or combination of components of the slider are energized. Having a consistent close point location regardless of the relative magnitude of heat source in a write mode provides high accuracy in clearance setting, for essentially all the heads in the fly height distribution. Being able to set clearance correctly in a write mode provides for improved life of HAMR sliders, while also offering consistent conditions for best performance of the head.

Figure 3:
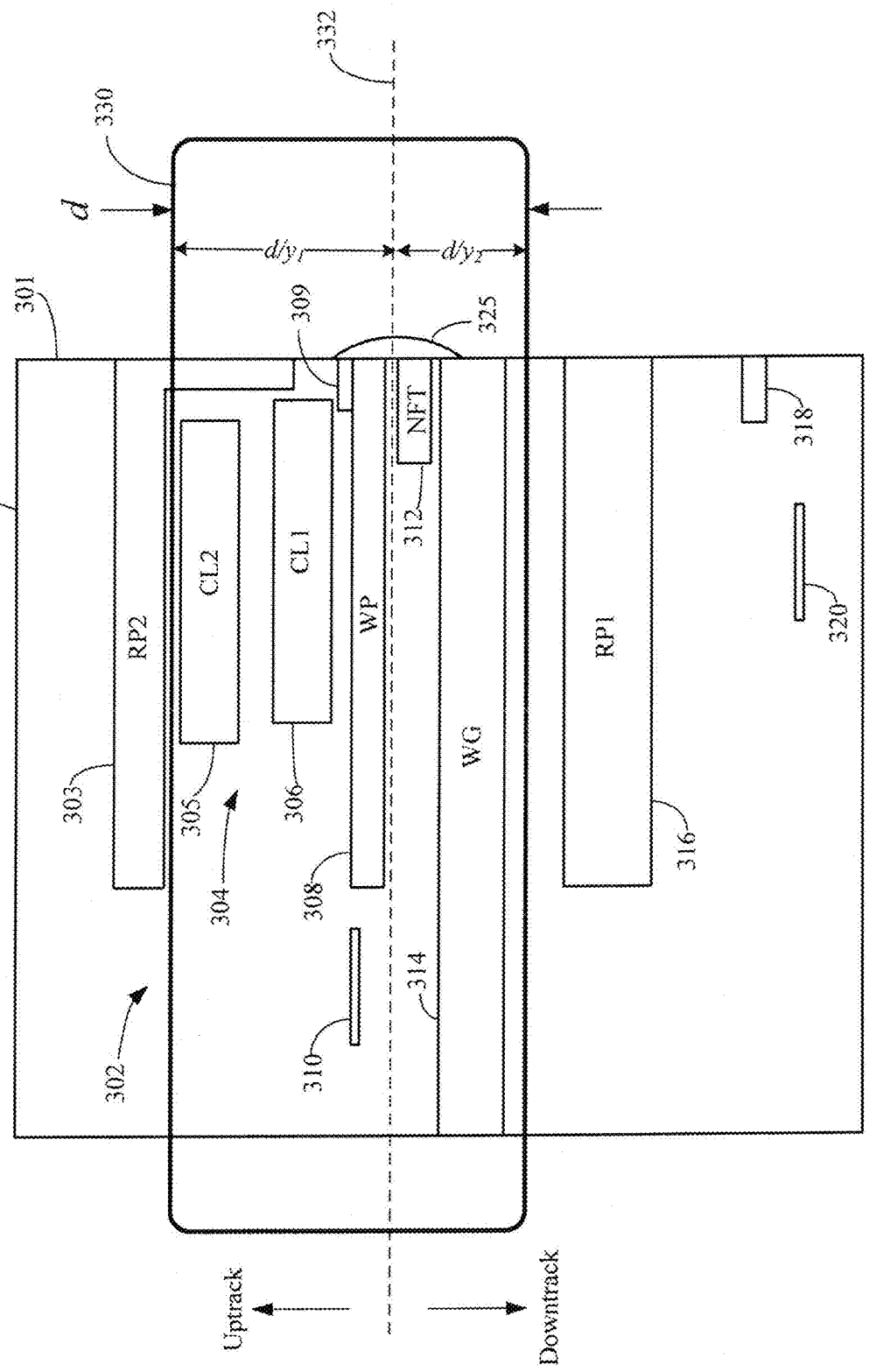
FIG. 3 illustrates a HAMR slider configured to provide a consistent close point for writing in accordance with various embodiments.

FIG. 3 illustrates a HAMR slider configured to provide a consistent close point for writing in accordance with various embodiments. The HAMR slider 300 shown in FIG. 3 provides for co-location of a number of different heat sources which provides for a consistent writer close point. The term co-location used herein refers to locating components of a slider within a predetermined distance from a vertical plane which is oriented perpendicular to the ABS of the slider and in line with a close point of the slider (e.g., a close point of the writer). Heat producing or dissipating components of the slider that are positioned within a predetermined distance from this vertical plane are said to be co-located.

It is understood that heat sources of the slider 300 include components that produce heat and components that dissipate heat, and that the term heat producing component is interchangeable with the term heat dissipating component. The portion of the slider 300 shown in FIG. 3 includes a number of components at or near an ABS 301 of the slider 300. A writer 302 of the slider 300 includes a number of components, including a second return pole (RP2) 303 proximate a write coil arrangement 304. The write coil arrangement 304 includes an upper coil (CL2) 305 and a lower coil (CL1) 306. The write coil arrangement 304 is configured to energize a write pole (WP) 308 of the slider 300. It is understood that the write coil arrangement 304 may conform to any writer coil design, including a double-pancake design (as shown in FIG. 3), single-layer pancake design, or a helical coil design. For example, the writer coil arrangement 304 may include an upper coil (CL2) 305 positioned above the write pole (WP) 308 and a lower coil (CL1) 306 positioned below the write pole (WP) 308 (e.g., between the write pole (WP) 308 and first return pole (RP1) 316).

The write pole 308 applies magnetic flux near the media-facing surface (ABS 301) of the slider 300 in response to application of current to the write coil arrangement 304. In some embodiments, a write pole heat sink 309 is in thermal contact with the write pole 308. A writer heater 310 is positioned proximate (e.g., adjacent and in line with) the write pole 308 and configured to thermally actuate the write pole 308 during write operations. An NFT 312 is situated proximate the write pole 308 and is optically coupled to an optical waveguide (WG) 314. The writer 302 also includes a first return pole (RP1) 316, which is magnetically coupled to the write pole 308 and the second return pole 303. It is noted that in a conventional HAMR slider, the writer heater 310 is situated adjacent the first return pole 316 (outside the region 330). The slider 300 shown in FIG. 3 also includes a reader 318. A reader heater 320 is located proximate the reader 318. The reader heater 320 is configured to thermally actuate the reader 318 during read operations.

FIG. 3 shows a region 330 within which a number of heat-producing/dissipating components of the slider 300 are situated. The region 330 is shown to include a vertical plane 332 which is oriented perpendicular to the ABS 301 of the slider 300. Notably, the vertical plane 332 is in line with a close point 325 of the writer 302 that is developed during certain operation, such as during write operations. The slider 300 is configured so that the major heat producing/dissipating components that influence the location of the writer close point 325 are in proximity of the same vertical plane 332. More particularly, the major heat producing/dissipating components of the writer 302 are placed within a predetermined distance (downtrack or uptrack) from the vertical plane 332.

As shown in FIG. 3, the region 330 has a total distance, d, along the ABS 301 which encompasses the vertical plane 332. The total distance, d, includes an uptrack distance, $d/y_1$, and a downtrack distance, $d/y_2$. Each of the uptrack distance, $d/y_1$, and the downtrack distance, $d/y_2$, is referred to herein as a predetermined distance relative to the vertical plane 332. As shown, $d/y_1 \neq d/y_2$, in which case the region 330 is not symmetrical relative to the vertical plane 332. However, depending on the particular slider design, the predetermined distances $d/y_1$ and $d/y_2$ can be the same or nearly the same (e.g., the region 330 is symmetrical or nearly symmetrical relative to the vertical plane 332).

The major heat producing/dissipating components of the slider 300 that impact the location of the writer close point 325 are placed within a predetermined distance of $d/y_1$ or $d/y_2$ from the vertical plane 332. By co-locating the major heat producing/dissipating components of the slider 300 within the region 330, a consistent close point 325 of the writer 302 is developed irrespective of which of heat producing/dissipating component or combination thereof is/are energized.

Depending on the design of the slider 300, different heat-producing/dissipating components of the slider 300 can be situated within the region 330. It is noted that the region 330 shown in FIG. 3 encompasses various components for purposes of illustration, and that the region 330 can include or exclude certain components depending on the slider design. In some embodiments, at least the upper coil 305, lower coil 306, write pole 308, writer heater 310, and NFT 312 are included within the region 330, such that these components are placed within the predetermined distance of $d/y_1$ or $d/y_2$ from the vertical plane 332. In other embodiments, at least the lower coil 306, write pole 308, writer heater 310, and NFT 312 are included within the region 330. In embodiments that incorporate the write pole heat sink 309, this component is also included within the region 330. In embodiments where the second return pole 303 extends along the ABS 301 toward the write pole 308 (as shown in FIG. 3), at least a portion of the second return pole 303 can be included within the region 330. In other embodiments, a diffuser extends from the NFT 312 along the write pole 308, and this diffuser is included within the region 330 (see e.g., FIGS. 4 and 5).

In accordance with the particular embodiment shown in FIG. 3, eight heat producing/dissipating components of the slider 300 are captured within the region 330. More particularly, eight heat producing/dissipating components are situated on the slider 300 within a predetermined distance of $d/y_1$ or $d/y_2$ from the vertical plane 332. These eight components include the upper coil 305, lower coil 306, write pole 308, write pole heat sink 309, writer heater 310, NFT 312, waveguide 314, and at least a portion of the second return pole 303. Although not shown in FIG. 3, according to some slider embodiments, the first return pole 316 can be included within the region 330.

According to some embodiments, the region 330 excludes the upper coil 305. The write coil arrangement 304 generates considerable heat during writing due to Joule heating, hysteresis loss, and eddy current heating. Although both the upper coil 305 and lower coil 306 generate heat when energized, in some designs, the lower coil 306 is responsible for generating the predominant amount of heat (>90%) produced by the write coil arrangement 304. In embodiments where single-layer pancake or helical coil designs are employed, all or only a portion of these coil configurations can be included within the region 330.

Heat produced by the writer heater 310 significantly impacts the location of the writer close point 325. In the slider design shown in FIG. 3, the writer heater 310 is positioned behind and approximately in line with the write pole 308. This placement of the writer heater 310 serves to produce an ABS protrusion near the location of the write pole 308. In other slider designs, the writer heater 310 can be located elsewhere (e.g., uptrack or downtrack of the position shown), such as above and behind the lower coil 306 (uptrack) or between the waveguide 314 and the first return pole 316 (downtrack). The writer heater 310 can be relocated uptrack or downtrack of its presently shown position while still maintaining a consistent writer close point 325. If the writer heater 310 is moved uptrack from its present position (e.g., above and behind the lower coil 306), then the writer heater 310 needs to be more recessed into the slider 300 (i.e., moved further from the ABS 301). If the writer heater 310 is moved downtrack from its present position (e.g., between the waveguide 314 and the first return pole 316), then the writer heater 310 needs to be moved closer to the ABS 301.

According to various embodiments, the total distance, d, of region 330 shown in FIG. 3 can range between about 2 and 6 μm. For example, the major heat-producing/dissipating components of the slider 300 can be situated within a predetermined distance of $d/y_1$ or $d/y_2$ from the vertical plane 332, where $d/y_1 + d/y_2 = \sim 6$ μm, ~5 μm, ~4 μm, ~3 μm, or ~2 μm (or any value between these integer increments).

The intended close point 325 can be a close point for the NFT 312, for example. The intended close point 325 can be at a location of the slider ABS 301 different from the NFT close point, such as a close point for the write pole 308, the write pole heat sink 309, the second return pole 303 or the first return pole 316. The location of the region 330 and the particular heat-producing/dissipating components situated within the region 330 can be selected to achieve an intended (consistent) close point 325 at any desired location along the writer ABS 301.

Figure 4A:
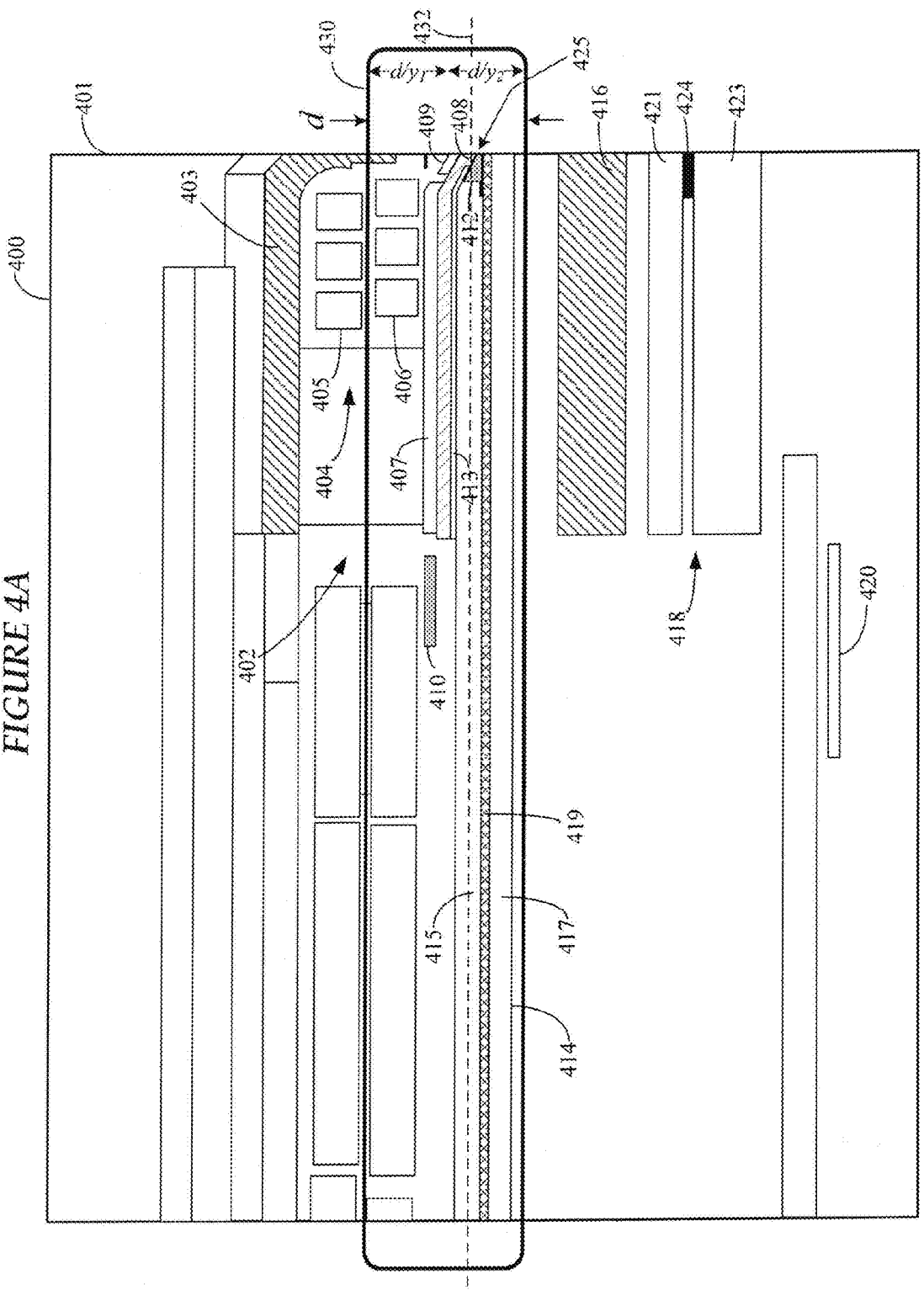
FIG. 4A illustrates a HAMR slider configured to provide a consistent close point for writing in accordance with various embodiments.
Figure 4B:
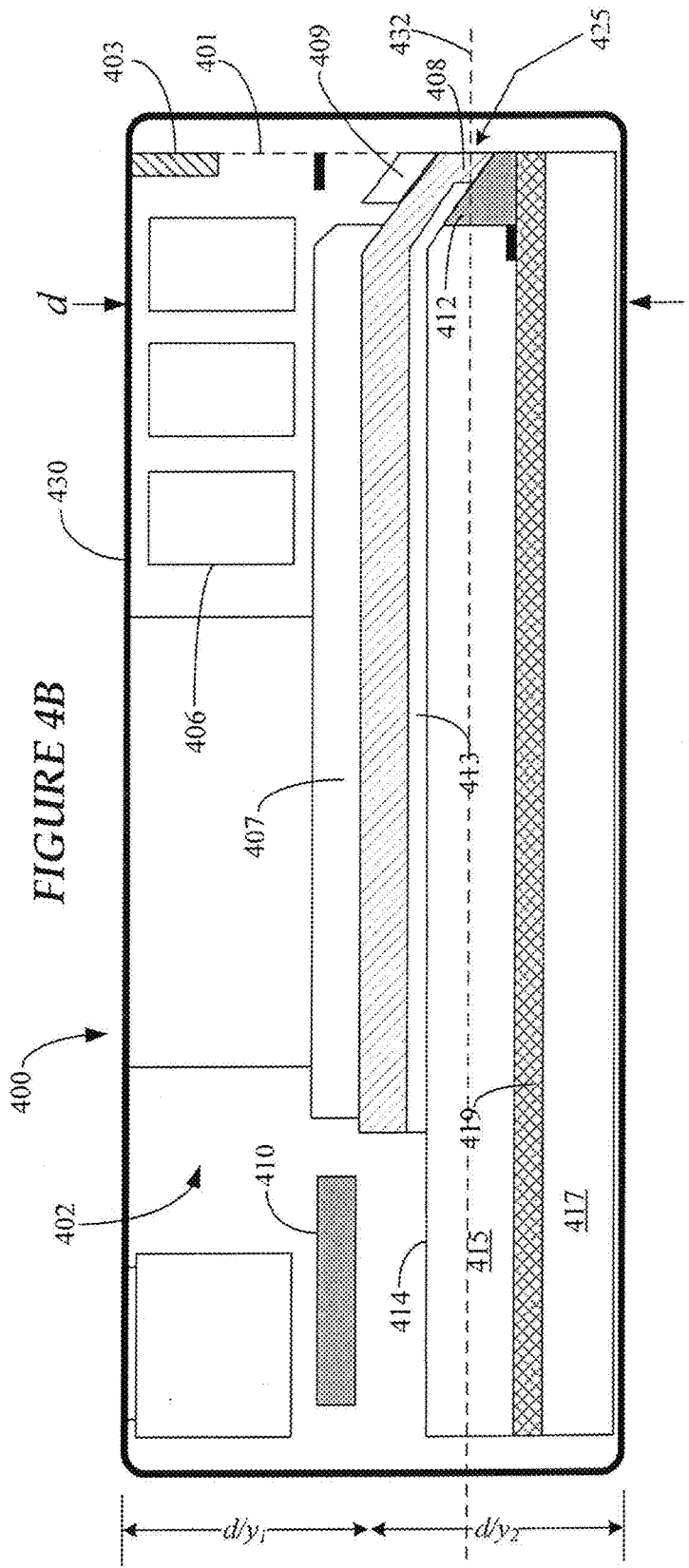
FIG. 4B is a detailed view of a portion of the writer shown in FIG. 4A.

FIGS. 4A and 4B illustrate a HAMR slider configured to provide a consistent close point for writing in accordance with various embodiments. FIG. 4A shows a portion of the slider 400 which includes a writer 402 and a reader 418. FIG. 4B is a detailed view of a portion of the writer 402 which is included within a region 430 having a total dimension of d. As was previously discussed, the total dimension, d, includes a predetermined distance of $d/y_1$ and $d/y_2$ from the vertical plane 332 which is oriented perpendicular to the ABS 401 of the slider 400 and in line with an intended close point 425 of the writer 402 that is developed during writer operations. The slider 400 shown in FIGS. 4A and 4B provides for co-location of a number of different heat sources which provides for a consistent writer close point 425.

The portion of the slider 400 shown in FIG. 4 includes a number of components at or near an ABS 401 of the slider 400. A writer 402 of the slider 400 includes a number of components, including a second return pole 403 proximate a write coil arrangement 404. The write coil arrangement 404 includes an upper coil 405 and a lower coil 406. As was discussed previously, the write coil arrangement 404 may conform to any writer coil design, including a double-pancake design, single-layer pancake design, or a helical coil design, for example.

The write coil arrangement 404 is configured to energize a write pole 408 of the slider 400. A magnetic yoke 407 is disposed between the write coil arrangement 404 and the write pole 408. A write pole heat sink 409 is thermally coupled to the write pole 408. A writer heater 410 is positioned proximate the write pole 408 is configured to thermally actuate the write pole 408 during write operations. An NFT 412 is situated proximate the write pole 408 and is optically coupled to an optical waveguide 414. The waveguide 414 includes an upper cladding layer 415, a lower cladding layer 417, and a core 419 between the upper and lower cladding layers 415 and 417. A diffuser 413 thermally couples to the NFT 412 and extends between at least a portion of the write pole 408 and the upper cladding layer 415. The writer 402 also includes a first return pole 416, which is magnetically coupled to the write pole 408 and the second return pole 403. The slider 400 shown in FIG. 4 also includes a reader 418. The reader 418 includes a read element (e.g., a GMR sensor) disposed between a pair of reader shields 421 and 423. A reader heater 420 is located proximate the reader 418, which is configured to thermally actuate the reader 418 during read operations.

Referring to FIG. 4B, the region 430 includes a number of heat-producing/dissipating components of the writer 402. The slider 400 is configured so that the major heat producing/dissipating components of the writer 402 are in proximity of the same vertical plane 432. The major heat producing components of the writer 402 are placed within the predetermined distance of $d/y_1$ or $d/y_2$ from the vertical plane 432. The predetermine distance of $d/y_1$ or $d/y_2$ and the location of the intended close point 425 can be the same as previously described. Co-locating the major heat producing/dissipating components of the slider 400 within the region 430 provides for development of a consistent close point 425 of the writer 402 for any fly height selected.

Depending on the design of the slider 400, different heat-producing/dissipating components of the writer 402 can be situated within the region 430. In some embodiments, at least the lower coil 406, write pole 408, writer heater 410, and NFT 412 are included within the region 430, such that these components are placed within the predetermined distance of $d/y_1$ or $d/y_2$ from the vertical plane 432. In other embodiments, at least the lower coil 406, write pole 408, writer heater 410, NFT 412, and waveguide 414 are included within the region 430, such that these components are placed within the predetermined distance of $d/y_1$ or $d/y_2$ from the vertical plane 432. In embodiments that incorporate a diffuser 413, this component is included within the region 430. In embodiments that incorporate the write pole heat sink 409, this component is included within the region 430. In embodiments where the second return pole 403 extends along the ABS 401 toward the write pole 408, at least a portion of the second return pole 403 can be included within the region 430.

Figure 5A:
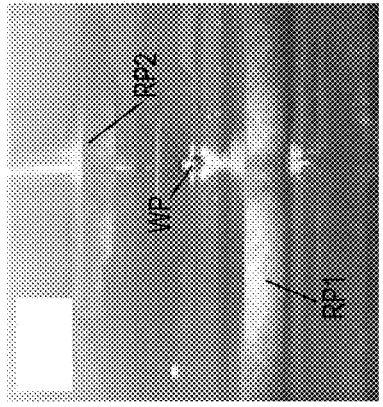
FIGS. 5A, 6A, and 7A are views of a writer of a conventional HAMR slider in which different heat-producing components of the writer are activated.
Figure 5B:
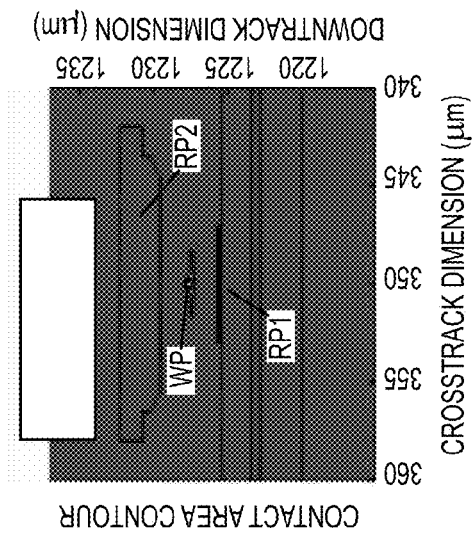
FIGS. 5B, 6B, and 7B are contact area contour profiles showing the locations of contact at the close point of the slider characterized in FIGS. 5A, 6A, and 7A.
Figure 6A:
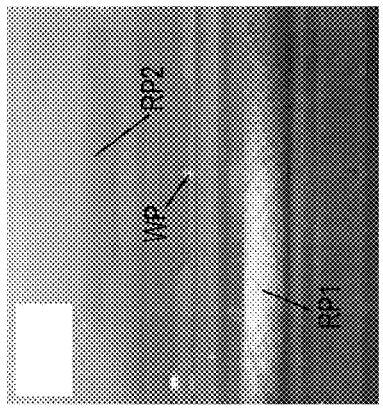
Figure 6B:
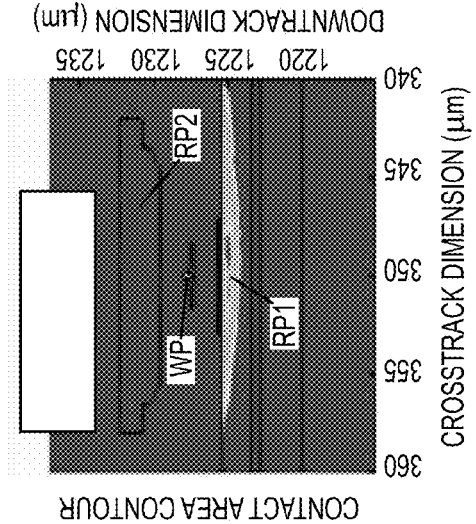
Figure 7A:
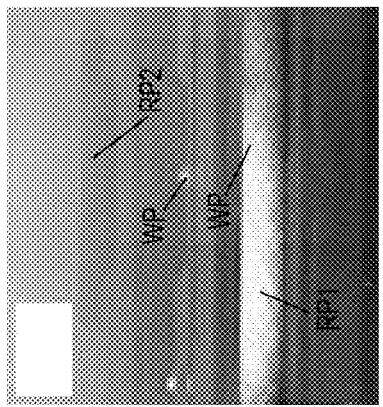
Figure 7B:
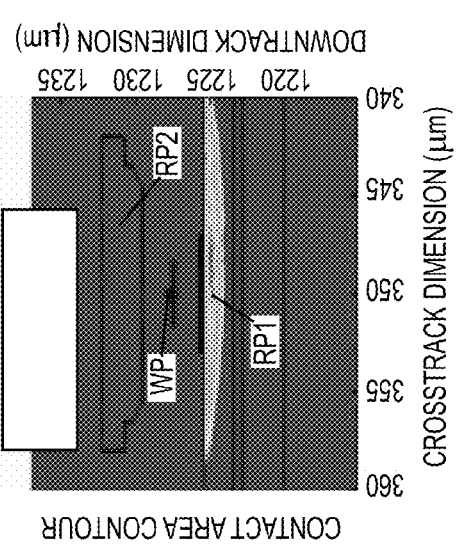

FIGS. 5A, 6A, and 7A are views of a writer of a standard HAMR slider in which different heat-producing components of the writer are activated. The white regions in FIGS. 5A, 6A, and 7A are regions where burnishing has occurred due to contact between the slider and a magnetic recording medium. FIGS. 5B, 6B, and 7B are contact area contour profiles showing the locations of contact at the close point of the slider's ABS. In FIGS. 5A-5B, 6A-6B, and 7A-7B, three possible close points are implicated depending on which level heat-producing components of the writer are energized. The three possible close points include RP1 (first return pole), WP (write pole), and RP2 (second return pole). The three structures RP1, WP, and RP2 can correspond to those discussed previously with reference to FIGS. 3 and 4A-4B.

FIGS. 5A-5B, 6A-6B, and 7A-7B demonstrate that the close point of the writer of a standard HAMR slider shifts between RP1 and RP2 depending on which heat-producing component or combination of components are energized. FIGS. 5A and 5B show the close point of the writer is at RP1 when only the writer heater is energized. FIGS. 6A and 6B show the close point of the writer is near RP1 but has shifted somewhat toward WP when the writer heater and the writer coil arrangement are energized. FIGS. 7A and 7B show the close point of the writer is between WP and RP2 when the writer heater, the writer coil arrangement, and the laser diode are energized. Such shifting of the close point makes it difficult to assess various performance parameters, such as WIWP (Writer Induced Writer Protrusion), and wHMS (writer head-media spacing) sigma increases, which can compromise reliability.

FIGS. 8A, 9A, and 10A are contact area contour profiles for a writer of a HAMR slider implemented in accordance with various embodiments. FIGS. 8B, 9B, and 10B are illustrations showing clearance of writer structures for the HAMR slider characterized in FIGS. 8A, 9A, and 10A. FIGS. 8A-8B, 9A-9B, and 10A-10B show that the close point (CP) of a HAMR slider implemented in accordance with the present disclosure remains at a consistent location, irrespective of which heat-producing component or combination of components are energized.

FIGS. 8A and 8B show that the close point, CP, of the writer is between RP2 and WP when only the writer heater is energized. More particularly, FIGS. 8A and 8B show that the close point, CP, of the writer is at or near the leading edge of RP2. At this location, the close point, CP, is near the WP. FIGS. 9A and 9B show that the close point, CP, of the writer is between RP2 and WP when the writer heater and the writer coil arrangement are energized. More particularly, FIGS. 9A and 9B show that the close point, CP, of the writer is at or near the leading edge of RP2. FIGS. 10A and 10B show that the close point, CP, of the writer is between RP2 and WP when the writer heater, the writer coil arrangement, and the laser diode are energized. More particularly, FIGS. 10A and 10B show that the close point, CP, of the writer is at or near the leading edge of RP2. It was found that sigma related operational variations (e.g., laser operating current ($I_{OP}$), laser write current ($I_W$), and fly height) do not cause the close point, CP, to shift from its intended location (e.g., the leading edge of RP2).

By placing the major heat-producing/dissipating components of the writer within a predetermined distance of $d/y_1$ or $d/y_2$ from a vertical plane passing through the intended close point, a consistent close point can be realized irrespective of which heat-producing/dissipating component or combination of components are energized. For example, the close point of a conventional HAMR slider can shift by up to about 8 μm depending on which heat sources are energized. In contrast, shifting of the close point of a HAMR slider having co-located heat sources according to the present disclosure can be limited to about 1 μm or less. HAMR sliders implemented in accordance with embodiments of the disclosure are expected to get 1-2 nm of wHMS (writer head-medium spacing) back, and as a result, realize improvements in bit error rate (log(BER)) of about 0.1-0.2 decades and in laser diode current of about 1-3 mA.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus, comprising:
    a slider configured for heat-assisted magnetic recording comprising:
        an air bearing surface (ABS);
        a writer;
        a close point of the writer located at the ABS; and
        a plurality of heat producing or dissipating components situated within a predetermined distance from a vertical plane that is normal to the ABS and aligned with the close point;
        wherein a location of the writer close point at the ABS remains substantially consistent irrespective of which of the plurality of heat producing or dissipating components are energized.

2. The apparatus of claim 1, wherein:
    the predetermined distance is a distance $d/y_1$ uptrack of the vertical plane or a distance $d/y_2$ downtrack of the vertical plane;
    a total distance, d, is a sum of the distances $d/y_1$ and $d/y_2$; and
    the total distance, d, is between about 2 and 6 μm.

3. The apparatus of claim 1, wherein:
    the predetermined distance is a distance $d/y_1$ uptrack of the vertical plane or a distance $d/y_2$ downtrack of the vertical plane;
    a total distance, d, is a sum of the distances $d/y_1$ and $d/y_2$; and
    the total distance, d, is between about 3 and 4 μm.

4. The apparatus of claim 1, wherein the plurality of components comprises a write coil, a write pole, a writer heater, and a near-field transducer of the slider.

5. The apparatus of claim 1, wherein the plurality of components comprises a lower coil of a double-pancake coil arrangement, a write pole, a writer heater and a near-field transducer of the slider.

6. The apparatus of claim 1, wherein the plurality of components comprises a write coil, a write pole, a writer heater, a near-field transducer, and an optical waveguide of the slider.

7. The apparatus of claim 1, wherein the plurality of components comprises a write coil, a write pole, a writer heater, a near-field transducer, and a write pole heat sink of the slider.

8. The apparatus of claim 1, wherein the plurality of components comprises a write coil, a write pole, a writer heater, a near-field transducer, a diffuser, and a write pole heat sink of the slider.

9. The apparatus of claim 1, wherein:
    the plurality of components comprises a write coil, a write pole, a writer heater, a near-field transducer, and a second return pole of the slider; and
    the close point is at or near a leading edge of the second return pole.

10. The apparatus of claim 1, wherein the close point is at or near one of a write pole, a near-field transducer, a write pole heat sink, a first return pole, and a second return pole of the slider.

11. An apparatus, comprising:
    a slider configured for heat-assisted magnetic recording comprising:
        an air bearing surface (ABS);
        a writer;

a close point of the writer located at the ABS; and a plurality of heat producing or dissipating components situated within a region of the slider that includes a vertical plane which is normal to the ABS and aligned with the close point, the region having a total distance, d, along the ABS of about 6 µm or less;

wherein a location of the writer close point at the ABS remains substantially consistent irrespective of which of the plurality of heat producing or dissipating components are energized.

12. The apparatus of claim 11, wherein:

the total distance, d, is defined by a sum of a distance $d/y_1$ uptrack of the vertical plane and a distance $d/y_2$ downtrack of the vertical plane; and the total distance, d, is between about 2 and 6 µm.

13. The apparatus of claim 11, wherein the plurality of components comprises a write coil, a write pole, a writer heater, and a near-field transducer of the slider.

14. The apparatus of claim 11, wherein the plurality of components comprises a write coil, a write pole, a writer heater, a near-field transducer, and at least a portion of a second return pole of the slider.

15. The apparatus of claim 11, wherein the plurality of components comprises a lower coil of a double-pancake coil arrangement, a write pole, a writer heater and a near-field transducer of the slider.

16. The apparatus of claim 11, wherein the plurality of components comprises a write coil, a write pole, a writer heater, a near-field transducer, and an optical waveguide of the slider.

17. The apparatus of claim 11, wherein the plurality of components comprises a write coil, a write pole, a writer heater, a near-field transducer, and a write pole heat sink of the slider.

18. The apparatus of claim 11, wherein the plurality of components comprises a write coil, a write pole, a writer heater, a near-field transducer, a diffuser, and a write pole heat sink of the slider.

19. The apparatus of claim 11, wherein:

the plurality of components comprises a write coil, a write pole, a writer heater, a near-field transducer, and a second return pole of the slider; and the close point is at or near a leading edge of the second return pole.

20. The apparatus of claim 11, wherein the close point is at or near one of a write pole, a near-field transducer, a write pole heat sink, a first return pole, and a second return pole of the slider.

* * * * *